(12) United States Patent
Graham (10) Patent No.: US 6,217,773 B1
(45) Date of Patent: Apr. 17, 2001

(54) TREATMENT OF WATER (75) Inventor: William Graham, Stellenbosch (ZA)

(73) Assignee: Garfield International Investments Ltd., Tortola (VG)

(*) Notice: Subject to any disclaimer, the term of this patent is extended or adjusted under 35 U.S.C. 154(b) by 0 days.

(21) Appl. No.: 09/341,886

(22) PCT Filed: Jan. 9, 1998

(86) PCT No.: PCT/GB98/00054

§ 371 Date: Sep. 17, 1999

§ 102(e) Date: Sep. 17, 1999

(87) PCT Pub. No.: WO98/30501

PCT Pub. Date: Jul. 16, 1998

(30) Foreign Application Priority Data

Jan. 9, 1997 (ZA) .................................... 97/0187

(51) Int. Cl.$^7$ .................................... B01D 61/00

(52) U.S. Cl. ............... 210/651; 210/636; 210/321.69; 210/223

(58) Field of Search ............... 210/651, 321.6, 210/321.78, 321.74, 454, 493.4, 494.1, 695, 636, 321.69, 223; 336/198; 335/219, 213

(56) References Cited

U.S. PATENT DOCUMENTS 5,106,491 * 4/1992 Schulze et al. .................. 210/87

* cited by examiner

Primary Examiner—Ana Fortuna
(74) Attorney, Agent, or Firm—Richard S. Vermut, Esq.; Rogers, Towers, Bailey, Jones & Gay, P.A.

(57) ABSTRACT

A desalinator is disclosed for removing dissolved solids from sea water or brackish water. The desalinator (10) comprising a casing (12) into which a pump (14) driven by a motor (16) pumps sea water or brackish water under pressure. A desalination cartridge (76) within the casing (12) includes semi-permeable material which acts as a reverse osmosis membrane and through which permeate is forced to separate it from the sea water or brackish water. The solids dissolved in the brackish water or sea water are retained in the salt retention passages of the cartridge (76). Three electrical coils (94, 96 and 98) encircle the cartridge (76) and are embedded in the walls of the casing (12). The coils are supplied with current from a supply (112) which is preferably a 50 Hertz, 380 Volt three phase supply. The coils are also connected by lines (108) to an adjustable frequency AC drive (110) which is in turn connected to the motor (16). The coils (94, 96 and 98) impose a magnetic field on the sea water or brackish water in the salt retention passages which enhances the rate at which water permeates through the reverse osmosis membrane and also inhibits fouling. The coils (94, 96 and 98) additionally act as chockes for the motor (16).

12 Claims, 7 Drawing Sheets

TREATMENT OF WATER

FIELD OF THE INVENTION

This invention relates to the treatment of water to remove dissolved solids.

BACKGROUND TO THE INVENTION

It is known that sea water and brackish water can have the dissolved solids removed therefrom, that is, they can be desalinated, by the method known as reverse osmosis. The water is pumped, at a pressure of twelve to seventy Bar, through a desalination cartridge which uses a complex polymer as a semi-permeable membrane. The pressures used are required to overcome the natural osmotic pressure of the feed water. Pressures at the lower end of the range are used for brackish water and the higher pressures are used for sea water.

The type of cartridge most widely used in desalination comprises a multitude of fine hollow filaments of the complex polymer, the water being pumped into the spaces between the filaments. The filaments are of about the same cross sectional dimension as a human hair. Permeate (product water) flows through the walls of the filaments into their bores. The bores, which are also referred to as lumens, form the permeate passages. In this form of cartridge there are salt retention passages externally of the filaments and, as stated, the permeate water passages are constituted by the bores of the filaments.

The second type of cartridge which is widely used is the spirally wound type. In this form of cartridge flat sheets of the complex polymer are spirally wound onto a central core which is in the form of a hollow tube with a multitude of holes in it.

Between each adjacent pair of sheets of complex polymer there is a grid. The grids act as spacers which hold the sheets apart and form alternate salt retention passages and permeate passages between the sheets. The grids in the salt retention passages are intended additionally to introduce turbulence into the water flow. A stack of, for example, eight to twelve such sheets with spacers between them are wound onto the core simultaneously. The permeate passages spiral inwardly towards the core.

Older desalination plants tend to use cartridges comprising filaments. More recently installed plants use spirally wound cartridges. At present the total number of spirally wound cartridges in use is less than the number of cartridges using filaments. The disparity in numbers is, however, closing as most recently installed desalination plants use spirally wound cartridges and this is expected to continue in future.

A major problem with desalination is that of fouling of the semi-permeable membrane. Fouling arises from three sources. A major source is the deposition onto those surfaces of the polymer sheets or polymer filaments which bound the salt retention passages of layers of common salt and other solids such as magnesium and calcium. The sparingly soluble salts and other solids precipitate out as the water flows through the semi-permeable membrane from the salt retention passages to the permeate passages. This flow of water increases the concentration of the dissolved solids to such an extent that the remaining water is insufficient to maintain all the solids in solution.

The second source of fouling is organic. For example, algae, bacteria and the like grow on the semi-permeable membranes. The third source of fouling is solids which the filters conventionally used ahead of the desalination cartridge to remove solid particles fail to remove from the feed water.

Fouling is promoted by the fact that the polymer has a net negative charge whereas algae and bacteria have a net positive charge. Thus these organisms are preferentially attracted to the surfaces of the membrane where they are deposited and form colonies. Likewise, positive ions (cations) which are in sea water as a result of the disassociation of the dissolved solids are also preferentially attracted to the membrane.

It is well known that the rate of fouling of a cartridge increases in a non-linear manner with the permeate flow rate. Thus doubling the flow rate more than doubles the rate at which the desalination cartridge fouls. Fouling slows down the rate at which water flows through the membrane. Eventually the permeation rate decreases to such an extent that the cartridge must be defouled by treating chemically. A cartridge which has been excessively fouled may not, even after defouling, produce the same flow rate as it did prior to fouling.

As mentioned above, to minimize fouling of a conventional desalination cartridge including polymer sheets, turbulence inducing spacers are provided in the salt retention passages. Such spacers, by enhancing mixing of the water flowing in the salt retention passages, inhibit build-up of what is called the concentration polarization layer. This layer is immediately adjacent the membrane and in it the concentration of the dissolved solids is at a maximum. This layer not only forms a barrier to flow of water through the membrane but it is mainly from this layer that dissolved solids precipitate out to foul the membrane. Furthermore the existence of this layer of high concentration increases the osmotic pressure. Such turbulence inducing spacers only provide a partial solution to the fouling problem.

Fouling is a significant problem with desalination cartridges which include filaments as there are very fine interstices between the filaments in the mass of filaments. Hence the mass of filaments itself acts as an extremely efficient filter and intercepts and separates out any solid material in the feed water. Such material is retained in the mass of filaments and contributes to a reduction in the flow rate of the permeate.

In our PCT specification WO97/21630 we propose a structure which introduces turbulence into the feed water entering the salt retention passages for the purpose of further inhibiting the build up of concentration polarization layers with consequent fouling.

The main object of the present invention is to enhance the performance of a desalination cartridge.

A further object of the present invention is to inhibit the rate at which the desalination cartridge fouls thereby permitting a greater product flow rate to be achieved over a longer period of time.

BRIEF DESCRIPTION OF THE INVENTION

According to a first aspect of the present invention there is provided a method which includes the step of subjecting a reverse osmosis membrane, and the fluid on each side thereof, to a fluctuating magnetic field.

The present invention also provides a method of removing dissolved solids from water which method includes feeding said water through a salt retention passage bounded by said reverse osmosis membrane and subjecting the membrane, the water in the salt retention passage, and the water that has passed through the membrane, to said fluctuating magnetic field.

In the preferred form the method includes the step of feeding an electric current of varying amperage through a coil thereby to generate said fluctuating magnetic field.

According to a second aspect of the present invention there is provided apparatus comprising a reverse osmosis membrane having fluid passages on each side thereof and means for applying a fluctuating magnetic field to said membrane and said passages.

Where the apparatus is for removing dissolved solids from water it includes a salt retention passage bounded by said reverse osmosis membrane and means for feeding water to said salt retention passage so that the water flows along said salt retention passage, said salt retention passage lying in the magnetic field so that, in use, water in said passage is subjected to said fluctuating magnetic field.

In the preferred form the apparatus includes a coil and means for supplying a voltage of varying magnitude to said coil whereby said coil generates said fluctuating magnetic field. Said coil can encircle said salt retention passage. In this form there can be a casing of elongate form, a cartridge of elongate form in said casing, said cartridge including semi-permeable membranes bounding a multitude of salt retention passages, and at least two coils, the coils being spaced apart along the length of the casing.

In an advantageous form of the apparatus according to the invention there is provided three coils spaced apart along the length of the casing, there being a three phase AC supply, each coil having one of the phases connected to it whereby the fields generated by the three coils are out of phase with one another.

To further enhance the apparatus it can further include a plate with a plurality of holes in it between said means for feeding water and said cartridge, the holes in the plate dividing the water up into streams and directing said streams of water against the end of the cartridge whereby the water entering the salt retention passages has eddy currents in it and there is a pressure drop across said plate.

According to a third aspect of the present invention there is provided a retro-fit device for enhancing the operation of a cartridge which removes dissolved solids from water in a salt retention passage by means of reverse osmosis, the device comprising a coil which encircles the cartridge and means for applying a fluctuating current to the coil whereby the coil generates a magnetic field of fluctuating strength to which water in the salt retention passage is subjected.

According to a fourth aspect of the present invention there is provided a method of removing dissolved solids from water which method comprises feeding said water through a salt retention passage bounded by a reverse osmosis membrane and subjecting the water in the salt retention passage to a fluctuating magnetic field.

According to a fifth aspect of the present invention there is provided apparatus for removing dissolved solids from water which apparatus comprises a salt retention passage bounded by a reverse osmosis membrane, means for feeding water to said passage so that the water flows along said passage, and means for generating a magnetic field which fluctuates in strength, said salt retention passage lying in the magnetic field so that, in use, water in said passage is subjected to said fluctuating magnetic field.

BRIEF DESCRIPTION OF THE DRAWINGS

For a better understanding of the present invention, and to show how the same may be carried into effect, reference will now be made, by way of example, to the accompanying drawings in which.

Figure 1:
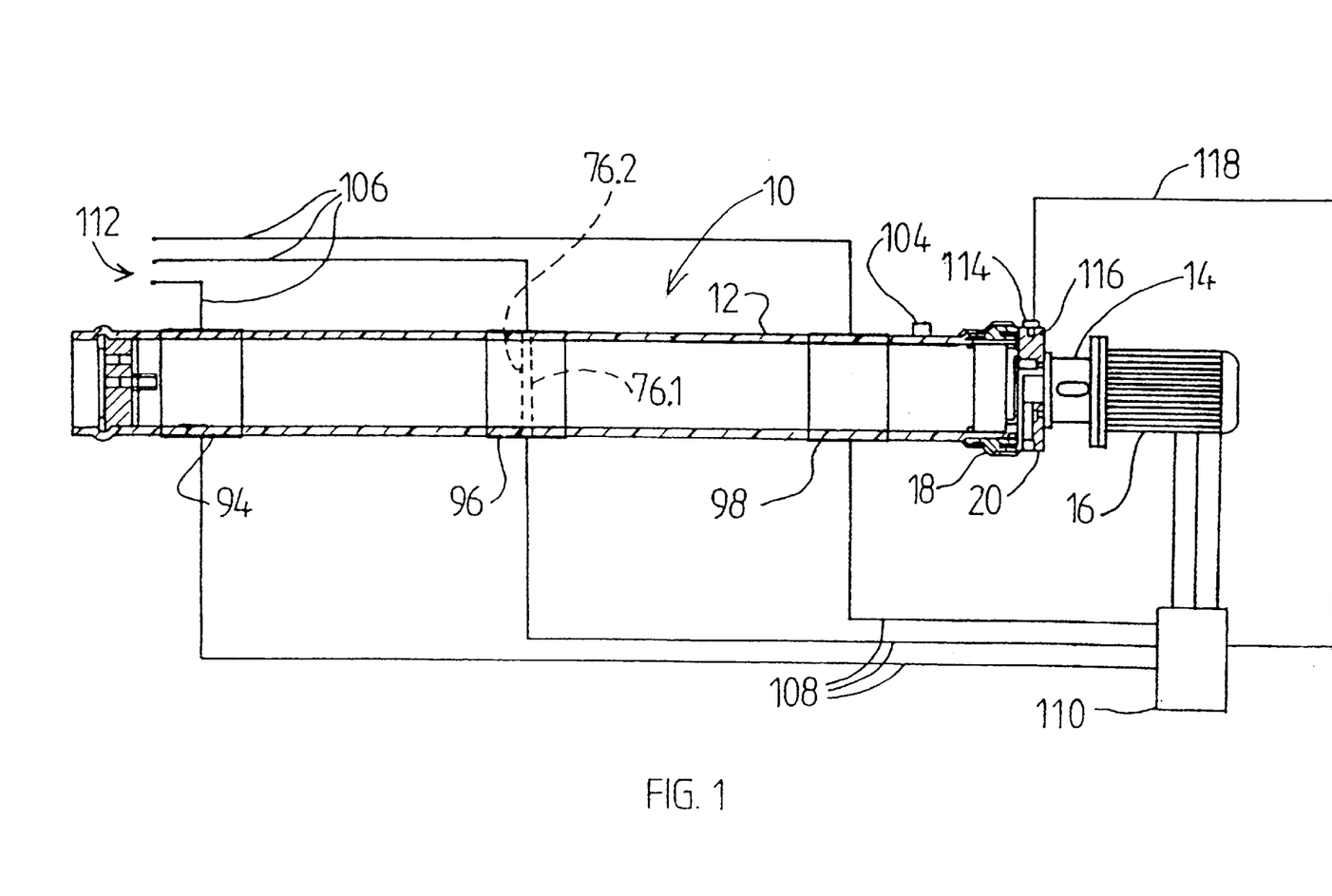
FIG. 1 is an axial section through a water desalinator including a desalination cartridge and three coils.

The water desalinator illustrated in FIG. 1 is generally designated 10 and comprises a horizontally elongate cylindrical casing 12. The casing 12 is of non-metallic material and is preferably fabricated by winding glass fibres in the form of rovings onto a rotating mandrel. Settable resin is simultaneously applied to the mandrel so that a hollow glass fibre reinforced cylindrical casing with a smooth inside surface is obtained. The resin can be applied by allowing the lowermost portion of the mandrel and of the partially fabricated casing to dip into a resin bath, excess resin being removed by a doctor blade. Such a casing is easily capable of withstanding internal pressures in excess of 70 Bar.

A pump 14 and electric motor 16 are attached to the inlet end of the casing 12 and pump water to be desalinated at a pressure typically of about fifty to sixty Bar into the casing 12. The motor 16 is preferably a three phase AC motor and the pump is preferably a D10 hydra-cell pump manufactured by Warren Engineering of Minneapolis, Minn., United States of America.

The pump 14 and motor 16 are secured to the casing 12 by means of an end ring 18 (see particularly FIG. 2) and a mounting plate 20. The end ring 18 is secured to the casing 12 by first fabricating an inner cylindrical part 12.1 of the casing 12, then sliding the ring 18 onto the part fabricated casing and then fabricating an outer part 12.2 of the casing with the ring 18 embedded between the inner and outer casing parts 12.1, 12.2. It will be understood that, apart from at the end zone where the ring 18 is between them, the parts 12.1 and 12.2 form an integral one piece casing with no discontinuity between them. The ring 18 has a series of circumferentially extending external ribs 22, these assisting in bonding the ring 18 to the casing 12.

Figure 2:
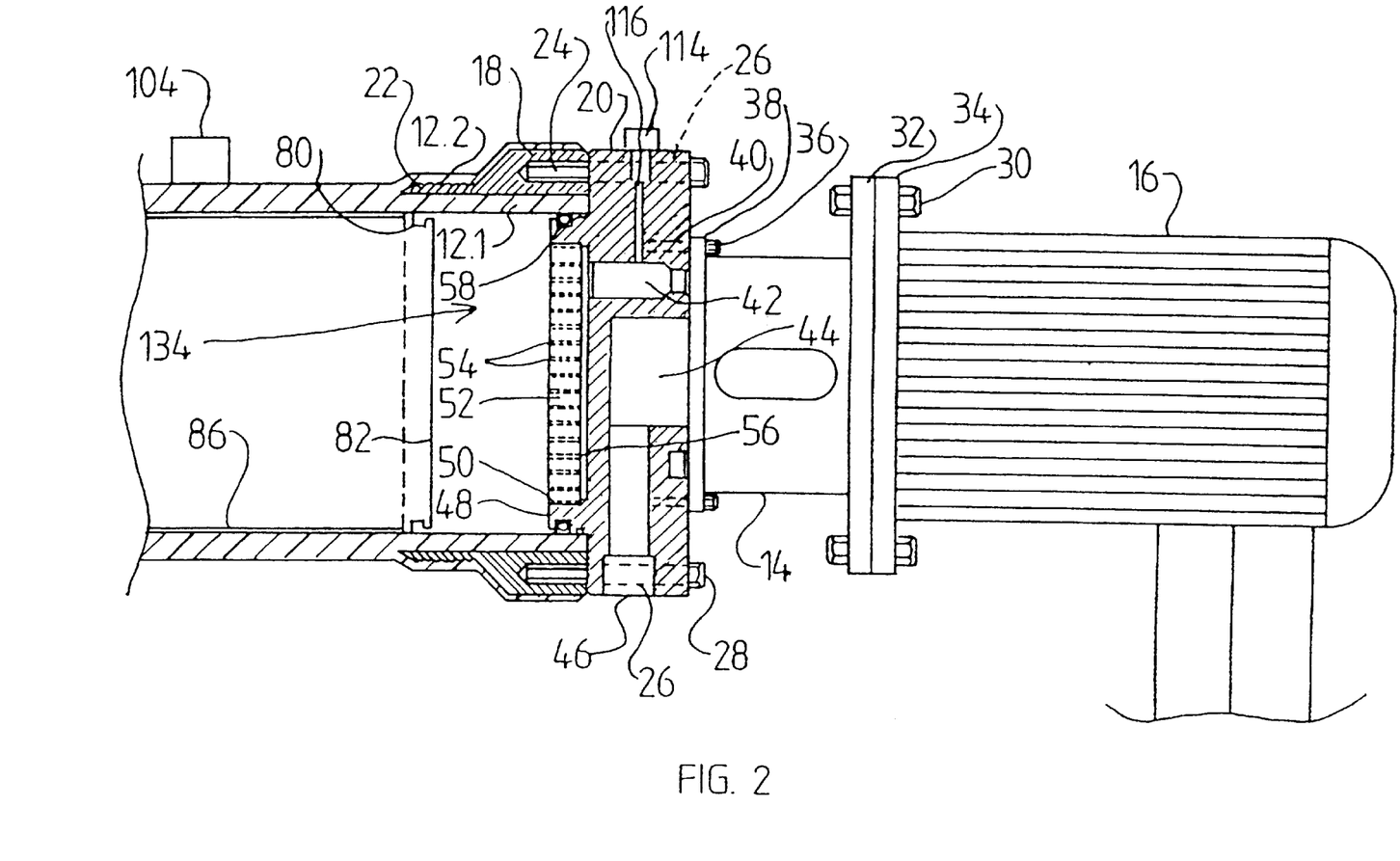
FIG. 2 illustrates, to a larger scale, the water inlet end of the desalinator, FIG. 2 being partly in section.

The ring 18 has a series of blind, tapped bolt holes 24 each of which opens through an end face of the ring 18. The plate 20 has through plain bores 26 which register with the tapped bolt holes 24. Bolts 28 pass through the bores 26 and are screwed into the holes 24 to attach the mounting plate 20 to the end ring 18.

The pump 14 and motor 16 are secured to one another by bolts 30 passed through flanges 32 and 34 of the pump 14 and motor 16 respectively.

Bolts 36 passed through a flange 38 of the pump 14 and into tapped bolt holes 40 of the plate 20 secure the plate 20 and pump 14 to one another. The pressure port of the pump 14 registers with a passage 42 which passes through the plate 20 and the suction port of the pump 14 is in register with an inlet passage 44 which extends radially inwardly from an inlet 46 of the plate 20 and then axially to register with the pump suction port.

The plate 20 is formed, on the side thereof remote from the pump 14, with a cylindrical wall 48 which has internal threading 50 around its periphery. An externally threaded, turbulence inducing plate 52 having a plurality of through holes 54 therein is screwed into the cylindrical space bounded by the wall 48. The plates 20 and 52 define a cavity 56 therebetween, the passage 42 opening into the cavity 56.

The through holes 54 of the plate 52 can be arranged in any desired pattern. For example, there can be holes arranged in a circular array. Alternatively the holes can be arranged along a number of lines radiating out from the centre of the plate 52, or can be in a spiral array which has its centre at the centre of the plate 52.

An O-ring 58 encircles the wall 48 and seals between the plate 20 and the inner surface of the casing 12.

At the other end of the casing 12 (see FIG. 3) there is an end plate 60. The end plate 60 is retained in the casing 12 by a pair of co-operating rings designated 62 and 64. The ring 62 is placed around the mandrel before fabrication of the casing 12 commences. It is thus embedded in the walling of the casing and results in the formation of an external rib 66 which encircles the casing 12. After the desalinator has been assembled, as will be described in more detail hereinafter, the ring 64 has its outside diameter decreased and it is then inserted into the casing so that it is in co-operating relationship with the ring 62 as shown thereby to prevent the plate 60 being forced out of the casing 12 under the influence of the internal casing pressure.

Figure 3:
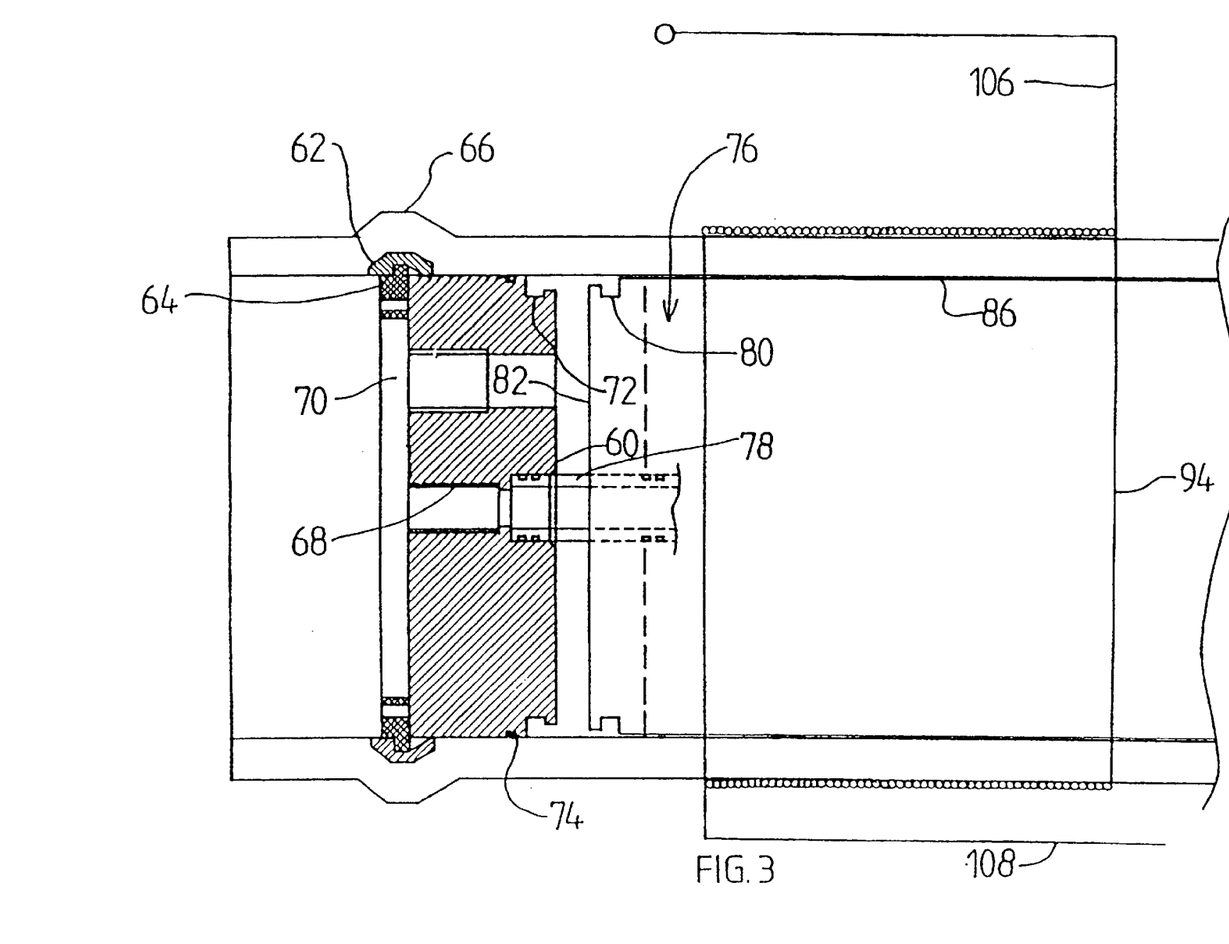
FIG. 3 illustrates the water outlet end of the desalinator, FIG. 3 being to a larger scale than FIG. 2 and also being partly in section.

An axial bore 68 in the plate 60 forms an outlet for purified (permeate) water and a bore 70 which is offset to one side of the bore 68 forms an outlet for brine. A U-seal (not shown) is inserted into a groove 72 in the plate 60. An O-ring 74 is provided in a further groove which encircles the plate 60 immediately adjacent the groove 72. The U-seal and O-ring prevent leakage between the casing 12 and the plate 60.

A desalination cartridge 76 of cylindrical form is slid into the casing 12 before the end plate 60 is secured in place by the rings 62 and 64.

Figure 4:
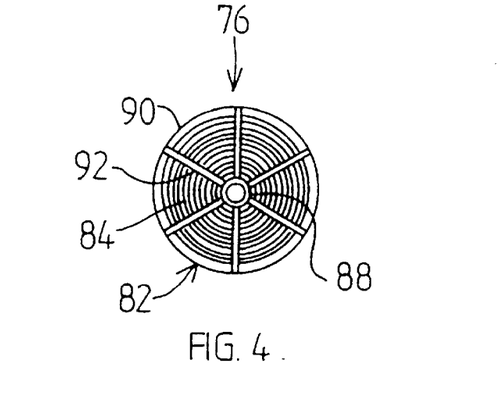
FIG. 4 is an end view of a desalination cartridge.

The cartridge 76, which comprises a plurality of polymer sheets and spacers wound as described above, will be described in more detail hereinafter. The sheets and spacers are spirally wound onto a central tube 78. At the outlet end of the desalinator the tube 78 protrudes from the wound sheets and spacers and enters the bore 68. A type of cartridge 76 which is suitable for use in the present invention is that manufactured and sold by Filmtech Corporation which is a wholly owned subsidiary of Dow Chemical Company. The product carries the designation FT30. U.S. Pat. No. 4,277,344 describes in detail the reverse osmosis principle. The filter cartridge 76 is generally cylindrical and is a tight fit in the casing 12. U-seals (not shown) are provided in grooves 80 (see particularly FIGS. 2 and 3) which encircle end caps 82 (see also FIG. 4) of the cartridge 76 and bear on the internal surface of the casing 12 to prevent water leaking between the casing 12 and the cartridge 76.

The wound sheets and spacers 84 (FIG. 4) are within a thin sheath 86 of a material such as fibreglass. The sheath 86 joins the end caps 82 to one another. The sheath 86 is not sufficiently strong to withstand the pressure applied to the inside thereof without splitting. It is thus a close fit within, and hence supported by, the casing 12. The U-seals in the grooves 80 prevent water flow between the sheath 86 and the casing 12.

Each end cap 82 is in the form of a spider (see FIG. 4) having an inner ring 88 and an outer ring 90 joined by spokes 92. The tube 78 passes through the inner ring 88 at the outlet end of the cartridge 76 and the grooves 80 are in the outer face of the ring 90.

Three coils 94, 96 and 98 are wound into the casing 12 as the casing is fabricated. More specifically, a relatively thin inner part 12.3 (FIG. 5) of the casing 12 is fabricated and then the coils 94, 96 and 98 are wound onto the inner part 12.3. The remainder of the casing 12 is then fabricated so that the coils 94, 96 and 98 are embedded in the casing with only the thin internal part 12.3 between them and the cartridge 76 and a thicker external casing part 12.4 outwardly thereof. The coils can be of highly conductive carbon fibres or of copper wire. The fibres or wires are coated so that they are electrically insulated from one another.

Figure 5:
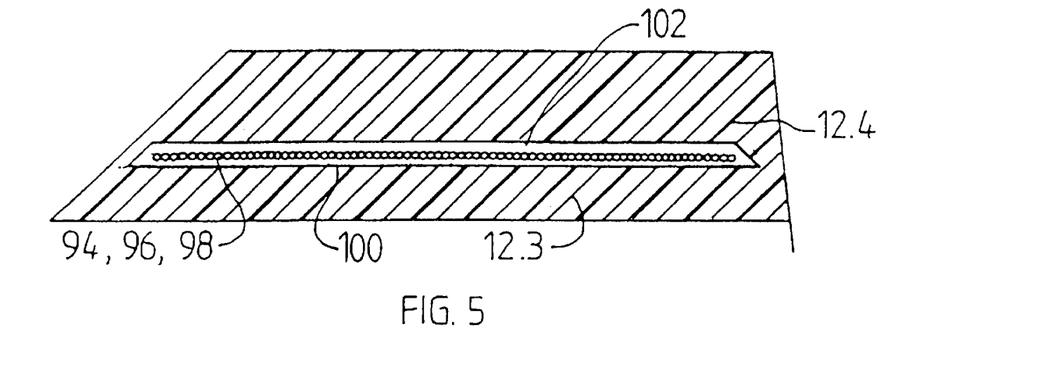
FIG. 5 is a detail of a casing forming part of the desalinator of FIGS. 1 to 3.

To protect the coils 94, 96 and 98, a layer 100 of soft gel (see FIG. 5) is coated onto the fabricated inner part 12.3 of the casing 12 before the coils are wound (see FIG. 5). A second layer 102 of gel is then applied over the coils. The two layers 100, 102 set but they do not become rigid. The gel layers protect the coils 94, 96 and 98 against water ingress through any cracks in those parts 12.3 of the casing 12 which are between the coils 94, 96 and 98 and the interior of the casing. The inner layer 100 of gel absorbs the dimensional changes imposed on the casing 12 with pressure changes thereby to prevent radial forces being imposed on the coils 94, 96 and 98.

Once the coils have been wound, feeder wires are run therefrom along the outer face of the casing part 12.3 to a common connection point which can be a junction box 104 (FIGS. 1 and 2) adjacent the inlet end of the desalinator. The feeder wires are, of course, embedded in the casing 12 when the outer casing part 12.4 is fabricated. In FIGS. 1 and 3, simply for illustrative purposes, the feeder wires (designated 106) and the further wires (designated 108) which connect the coils 94, 96 and 98 to an adjustable frequency AC drive designated 110, are shown as entering and leaving the casing 12 in the regions of the coils. In FIG. 3 the coil 94 is diagrammatically shown as being wound onto the outside of the casing 12.

Each of the coils 94, 96 and 98 is connected by its feeder wire 106 to one phase of a three phase AC supply 112 (see FIG. 1). If necessary shielding, for example in the form of braiding, can be used to prevent the effects of the magnetic fields being felt externally of the casing 12.

The drive 110 is connected to the motor 16. The preferred type of drive is the 1336 plus manufactured by Allen Brady (part of the Rockwell Group) of 1201 South Second Street, Milwaukee 53204, United States of America.

A pressure sensor 114 (FIGS. 1 and 2) is inserted into the plate 20 through a passageway 116 which communicates with the passage 42 which in turn communicates with the pressure port of the pump 14. The pressure sensor 114 is connected by a line 118 (FIG. 1) to the adjustable frequency AC drive 110 and provides the control signal therefor. The control signal is used to control the output frequency of the motor drive and hence the speed of the motor 16 thereby to maintain a constant pressure at the pressure port of the pump 14.

Whilst a single cartridge 76 is shown in the casing 12, it is possible to provide two or more cartridges end-to-end.

The water flows through each cartridge in turn. Each cartridge can have three coils associated therewith as described. Alternatively, as shown in chain dotted lines in FIG. 1, where two cartridges 76.1 and 76.2 are provided, the centre coil 96 can bridge across the two cartridges.

Figure 6:
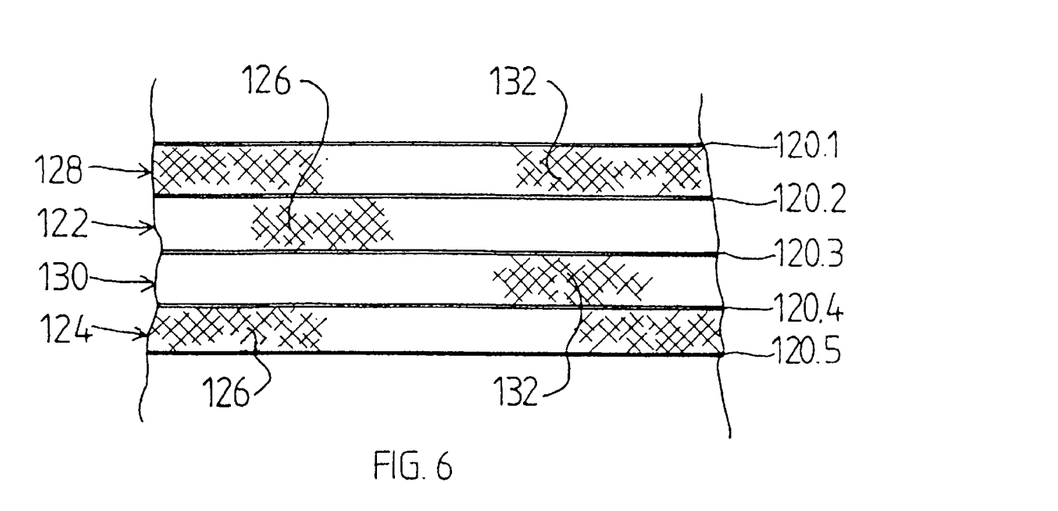
FIG. 6 is a diagrammatic representation, to a greatly exaggerated scale, of part of the desalination cartridge.

The structure of a part of the cartridge 76 is illustrated to a greatly exaggerated scale in FIG. 6. In FIG. 6 reference numerals 120.1 to 120.5 illustrate films of a complex polymer. Between the films 120.2 and 120.3 there is a first salt retention passage 122 and between the films 120.4 and 120.5 there is a further salt retention passage 124. In each of the passages 122, 124 there is a grid 126. The grid 126 acts as a turbulence inducing element. The grid 126 is, for example, composed of filaments of plastic material with welds at the points at which transversely extending filaments intersect longitudinally extending filaments. The grid 126 has the additional function of preventing the salt retention passages 122, 124 being closed up to the point where water flow between them becomes impossible.

Between the films 120.1 and 120.2 there is a permeate passage 128. Likewise, between the films 120.3 and 120.4 there is a permeate passage 130. There are grids 132 in the passages 128 and 130. The grids 132 are not intended to induce turbulence into the permeate in the passages 128, 130 but simply to prevent the passages being closed-up by applied pressure to the point where water cannot flow in them. It will be understood that there are a multiplicity of films, a multiplicity of salt retention passages and a multiplicity of permeate passages in the cartridge. Hence there are further films, passages and spacers on each side of the cartridge section shown in FIG. 6.

At the inlet end of the cartridge 76 the passages 128, 130 are closed and the passages 122, 124 are open. Hence the feed water enters the passages 122, 124 but not the passages 128, 130. In the region of the central tube 78 the salt retention passages 122, 124 are closed and the permeate passages 128, 130 are open so that permeate, but not brine, can flow into the tube 78.

The operation of the desalinator thus far described is complex and is not as yet fully understood by Applicants. The following explanation is based on what has been observed thus far in experimental work. Further experimental work may reveal that there are other factors and mechanisms involved of which Applicants are not currently aware.

When a spiral wound desalination cartridge is manufactured, it is desirable to maintain a constant tension on the films and spacers as they are wound onto the central tube 78. This is more easily achieved during the initial part of the winding operation. As the cartridge increases in diameter it becomes "spongy" in feel and it then becomes more difficult to maintain the films and spacers under the correct tension. Hence the turns of the cartridge tend to be more tightly packed adjacent the central tube 78 than they are adjacent the outer sheath 86. In a conventional desalination system water flows into the space 134 (FIG. 2) adjacent the inlet end of the desalination cartridge without having to flow through the plate 52. There is no significant pressure differential considered radially of the cartridge. More specifically the pressure close to the centre of the cartridge and the pressure close to the outer periphery of the cartridge are the same. Hence more water tends to enter the more open radially outer parts of the salt retention passages than enters the radially inner parts of the salt retention passages where the films and spacers are wound more tightly.

The plate 52 directs a multitude of streams of water against the end of the cartridge 76 and distributes water flow over the whole of the exposed end of the cartridge 76. This ensures that the radially inner parts of the cartridge are more fully utilized. The spokes 92 are made as small as possible by the manufacturer of the cartridge so as not to obstruct water flow. They cover very little of the end of the wound films and spacers and do not have any measurable effect on water pressure. Most significantly, they do not cause any pressure drop between the inlet to the space 134 and the entrances to the salt retention passages.

Sea water, and brackish water to a lesser extent, contain dissolved gasses and also contain bicarbonates. There is a pressure drop in the order of two Bar across the plate 54 and it is believed that this causes some of the oxygen and carbon dioxide present in the feed water to come out of solution as bubbles. Because the bubbles are still under substantial pressure they are very small. However, they are believed to have a scouring effect on the concentration polarization layers inhibiting their build up and hence enhancing the operation of the cartridge.

Observations of the brine emerging from the desalinator and flowing into a tank has revealed that the brine is aerated. In one experiment the brine and the permeate water were both being fed to a large storage tank where they were permitted to mix with one another. The tank also constituted the feed water supply. This was being done to permit the desalinator to be run experimentally for a period of time without requiring excessive quantities of sea water. It was noted that where the brine emerged from the discharge pipe into the tank it was aerated. Instead of simply sinking in the less dense sea water the brine rose some distance from the discharge pipe outlet. The observed bubbles were found to be a mixture of carbon dioxide and oxygen.

The streams of water emerging from the bores in the plate 54, and impinging on the end of the wound cartridge, flow into the salt retention passages and eddy currents can be detected in the streams of water. These eddy currents are transverse to the general direction of flow in the salt retention passages and further assist in preventing the formation of concentration polarization layers at the inlet ends of the salt retention passages. Of course, the eddy currents become weaker with increasing distance from the inlet ends of the salt retention passages and their effect on the concentration polarization layer thus diminishes.

The effect of the applied magnetic fields appears to be to sustain the eddy currents, introduced initially in the water streams, throughout the lengths of the salt retention passages. The advantageous "scouring" effect is currently thus felt throughout the cartridge and not just over a zone extending for a relatively short distance from the inlet ends of the salt retention passages.

As explained above, many foulants have a net positive charge whereas the complex polymer which acts as the semi-permeable membrane has a net negative charge. There are thus weak attractive forces between the foulants and the polymer. It is believed that the eddy currents maintained by the magnetic field are sufficient to overcome these weaker forces and inhibit build up of foulants on the polymer.

It has been found advantageous to wind the coils so that their magnetic fields overlap. In this regard reference is made to FIG. 7 which shows two coils (designated 96 and 98) which are sufficiently close together that their fields F1 and F2 overlap. Thus while, along the length of the casing 12, the Gauss varies from a maximum radially outward of either coil to a minimum midway between the coils, the magnetic field is always present. Simply by way of example, it has been found possible to create fields with a maximum Gauss of about two thousand immediately adjacent each coil. Midway between the coils the Gauss has fallen to about one thousand six hundred. The fields are, of course, out of phase.

Figure 7:
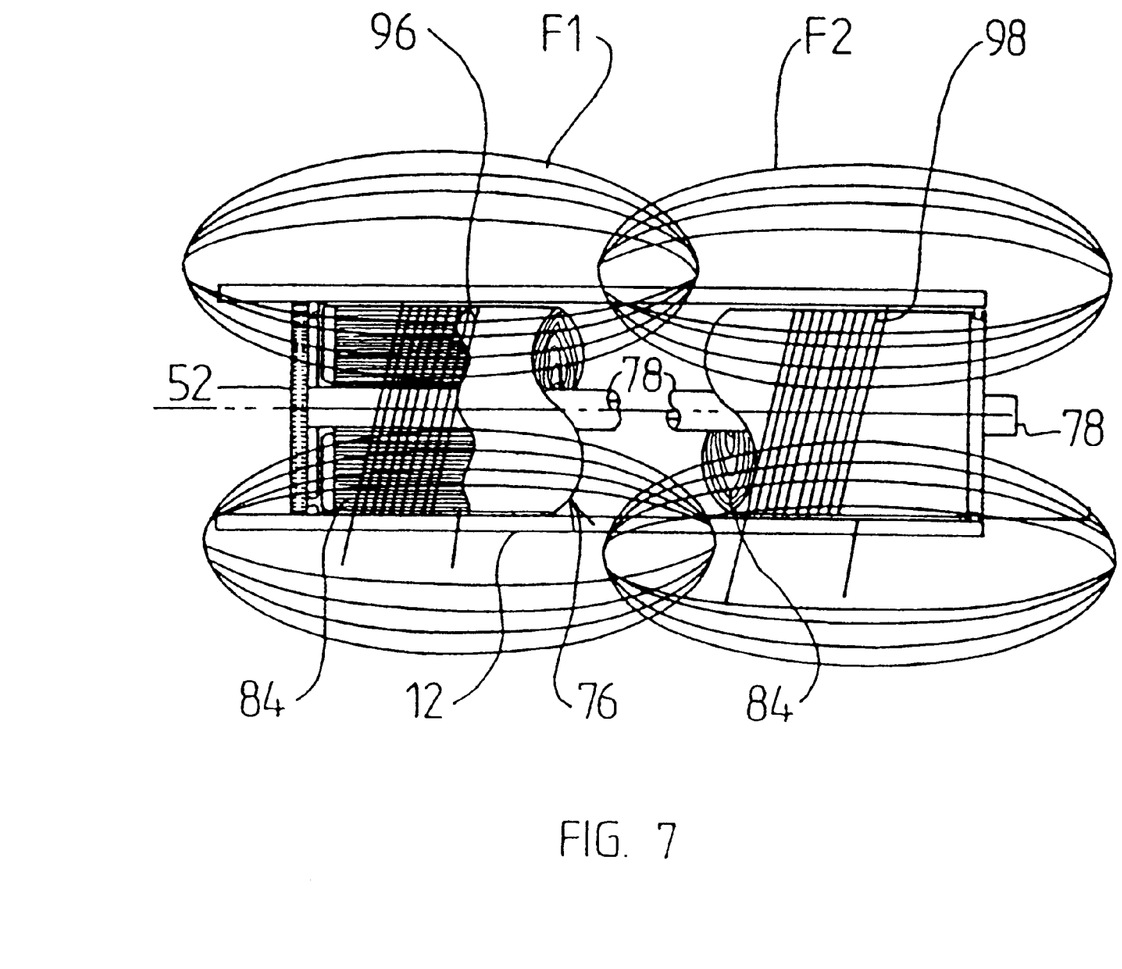
FIG. 7 illustrates the way in which magnetic fields generated by the coils interact.

In FIG. 7 the coils are shown as being wound with their turns skew to the axis of the cartridge 76, and have also been shown as being wound as part of the filter cartridge 76 instead of as part of the casing 12. In this regard the coils can be wound onto the cartridge either radially inwardly or radially outwardly of the sheath 86.

Applicants have found that a particularly advantageous desalinator can be provided by using a 50 Hertz, three phase AC supply of 380 volts. Such a supply is commonplace and both the motor 16 and drive 110 are designed for use with a supply of this nature. Applicants have found that by feeding the three phases of such a supply through the coils 94, 96 and 98 the advantageous effects described above are obtained and that in addition the coils act as chokes for the motor 16. This smooths out the spikes which inevitably result from the use of an AC motor and which themselves represent power losses. The amperage required to drive the motor 16 if the coils are disconnected from the circuit is typically two Amps more than is required when the coils are in circuit.

In a conventional desalinator the pressure drop across the cartridge 76 is typically about three Bar. Thus if sea water is being desalinated a suitable inlet pressure is sixty Bar and it is found that the pressure in the bore 70 is about fifty seven Bar. When the coils 94, 96 and 98 are in circuit there is no pressure drop across the cartridge. In fact, the pressure at the outlet end may even slightly exceed that at the inlet end. Applicant has not yet formulated a full explanation for this observed phenomena or for the fact that flow continues even though a "back-pressure" is being generated. A possible explanation is that there is an increase in entropy as a result of the energy input from the coils. Another possible reason is that the highly concentrated brine is acting in the same way as the core of a solenoid and being thrust towards the outlet ends of the salt retention passages by the forces applied.

Applicant's experimental work has shown that provided the current supplied to the coils varies cyclically so that fluctuating magnetic fields are created, neither the amplitude nor the frequency of the current is critical. Experimental work with frequencies from 5 Hertz to 7000 Hertz has shown that in the presence of a fluctuating magnetic field greater permeation rates can be obtained and significantly less fouling occurs.

It will be understood that if the frequency or type of current to be applied to the coils is incompatible with the drive 110 and motor 16, then the power supply to the motor and the power supply to the coils must be obtained from separate sources. DC current of varying voltage has also produced significant improvements in both permeate flow rate and in a reduction of fouling. The voltage and current can vary sinusoidally or a square wave form can be used.

Figure 8:
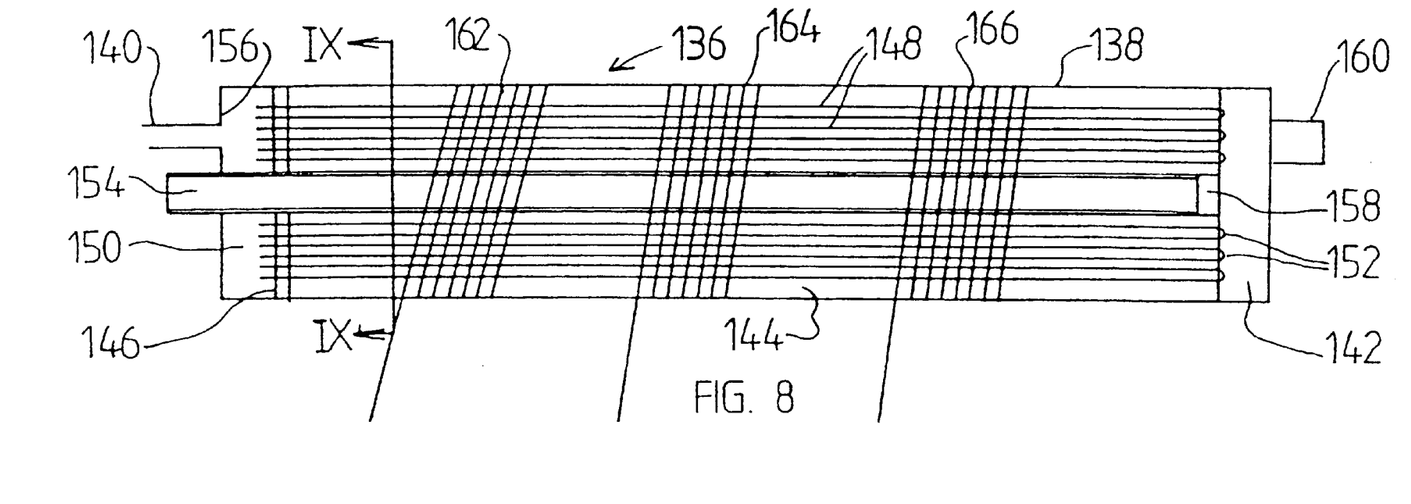
FIG. 8 is a diagrammatic elevation illustrating a further desalination cartridge and three coils.
Figure 9:
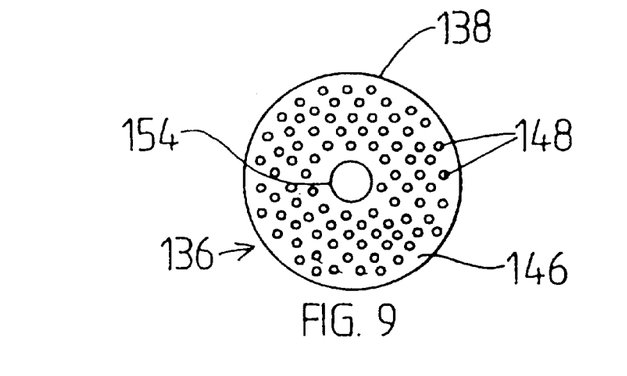
FIG. 9 is a section on the line IX—IX of FIG. 8.

FIGS. 8 and 9 diagrammatically illustrate a further form of desalinator which is designated 136. The desalinator 136 comprises an outer casing 138 which has an outlet at 140 for recovered water and a chamber 142 into which the brine flows. Between the outlet 140 and the main space 144 bounded by the casing 138 there is a partition 146. Embedded in the partition 146 are the ends of a multitude of hollow fibres 148 which are of a complex polymeric material capable of acting as a reverse osmosis membrane. The outlet 140 leads from a chamber 150 which communicates with the hollow interiors of the fibres where the ends thereof project through the partition 146. Each fibre extends from the partition 146, along the casing for substantially the full length thereof, turns back on itself at a hairpin bend 152 and then extends back to the partition 146.

A tube 154 passes through the partition 146 and through a transverse end wall 156 which bounds the chamber 150. The tube 154 has a plug 158 at its right hand end (as viewed in FIG. 8) and has a plurality of holes in the wall thereof. Water with dissolved solids in it is forced into the tube 154 and flows out of the tube 154 into the inter-fibre spaces which constitute salt retention passages. These passages communicate with the chamber 142 so that brine flows from these passages to the chamber 142 and then out of the plant via a brine outlet 160.

The structure thus far described in relation to FIGS. 8 and 9 is a conventional one that is widely used in the desalination industry.

Three coils 162, 164, 166 are shown encircling the desalination cartridge constituted by the mass of hollow fibres 148. These coils are equivalent to the coils shown in FIG. 1. They are energised in the same way so as to cause eddy currents in the salt retention passages that exist between the fibres. The effect of this is the same as described above in relation to the salt retention passages 122, 124.

Figure 10:
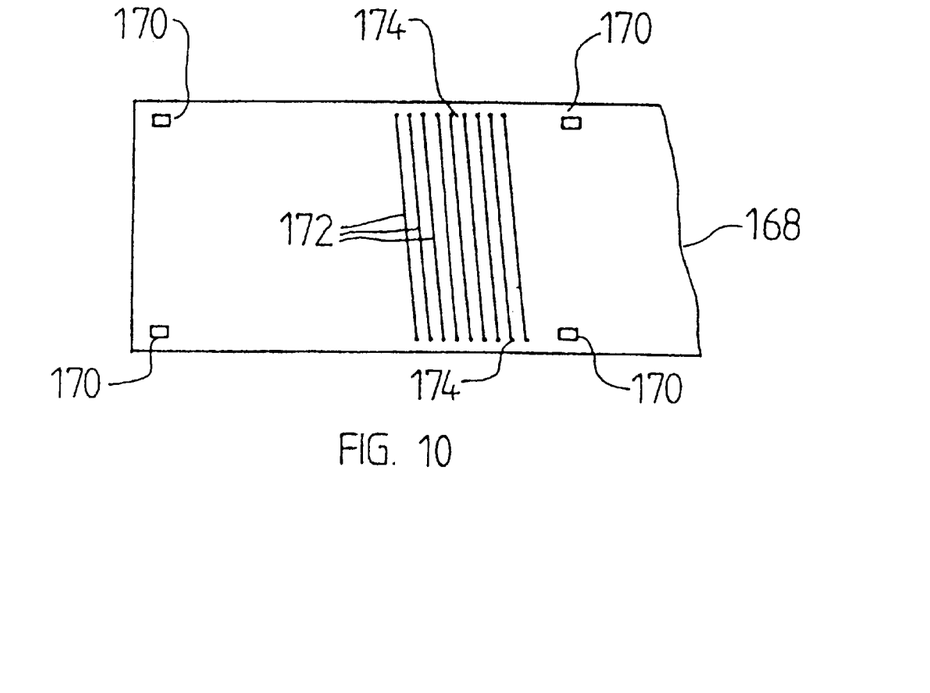
FIG. 10 diagrammatically illustrates part of a sheath in lay flat form.

Referring finally to FIG. 10, the structure illustrated comprises a rectangular sheet 168 of a material which can be rolled into the form of a cylindrical sheath. Fasteners 170 of any suitable type, for example, "pop" studs or pieces of the material known as "Velcro", are provided along the two elongate edges of the sheet so that, once rolled into the form of a sheath it can be fastened into that form. Sheet synthetic plastics material is suitable. The plastics material can be resiliently flexible but with sufficient stiffness so that, when rolled, it tends to unroll thereby maintaining it in cylindrical form. Alternatively it can be in the form of a blanket which is not self supporting.

A series of lengths of wire 172 are adhered or otherwise secured to that face of the sheet which becomes its inner face when the sheet 168 is rolled into the form of a sheath. Connectors 174 are provided at each end of each length of wire 172. When the sheet 168 is rolled into the form of a sheath, the connectors 174 along one edge of the sheet are attached to the connectors along the other edge of the sheet whereby the lengths of wires are joined end-to-end and constitute a coil.

The sheath can be wrapped around an existing desalinator or desalinator cartridge as a retro-fit structure. By connecting the coil constituted by the wire lengths to a source of fluctuating current, a magnetic field can be applied to the salt retention passages thereby to obtain the effects described above. It will be understood that a number of coils can be provided.

The provision of a lay flat sheet which can be wrapped around an existing desalinator to form a sheath is advantageous as it enables a coil to be used almost regardless of whatever piping etc there is and which obstructs the application of a rigid sleeve with coils. However, should the desalinator be constructed in such a way that there are no obstructions that would prevent a coil carrying sleeve being slid over the desalinator, then such a construction can be used to give the advantages described above.

Figure 11:
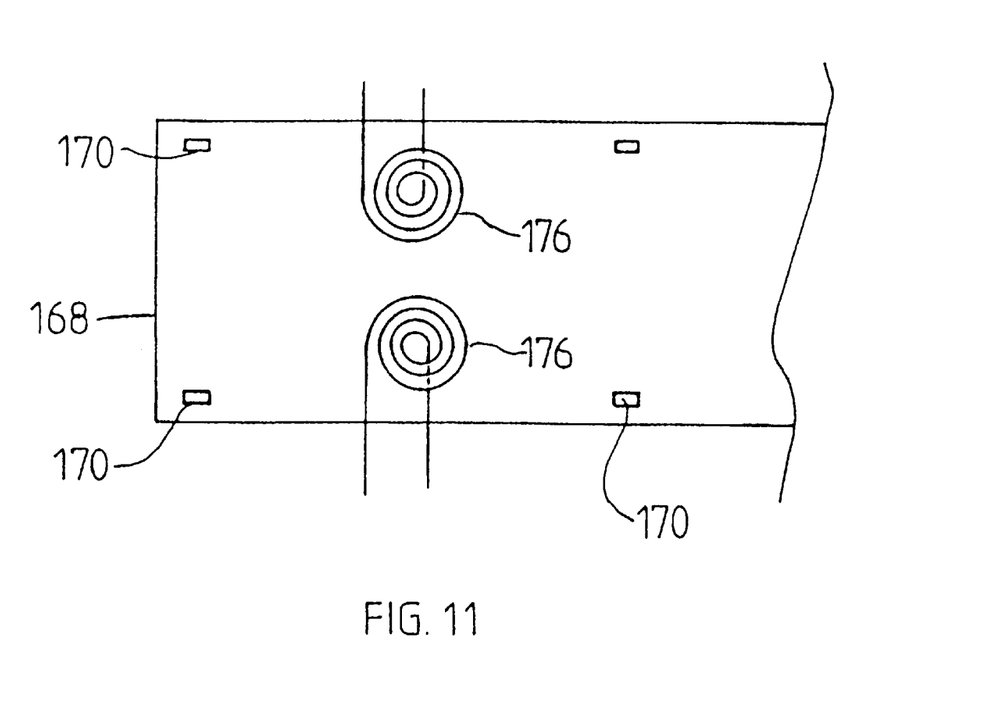
FIG. 11 diagrammatically illustrates part of a further sheath.

Whilst it is preferred that each coil be coaxial with the cartridge, it is possible for the coils to be arranged in other ways. For example, instead of being wound around the mandrel, the coils could be preformed and embedded in the wall of the casing so that each extended part-way around the periphery of the casing with the axis about which the coil is wound extending radially instead of axially. When this arrangement is applied to a retro-fit sheet, a structure as shown in FIG. 11 results. In this form the sheet, designated 168, has spaced pairs of coils 176 adhered thereto, The axis of each coil 176 is at right angles to the plane of the sheet 168. When the sheet is rolled to tubular form, the coils 176 take-up positions on opposite sides of the cartridge and their axes are generally radial. Each turn of the coil 176 is distorted as the sheet 168 is rolled so that it conforms to the cylindrical shape of the sheath.

What is claimed is:

1. A method for removing dissolved solids from water which method comprises the steps of:

feeding said water through a salt retention passage bounded by said reverse osmosis membrane;

subjecting the membrane, the water in the salt retention passage, and the water that has passed through the membrane, to a fluctuating magnetic field; and, feeding an electric current of varying magnitude to each of two coils spaced apart along the length of said salt retention passage to generate said fluctuating magnetic field, the water in the salt retention passage being in the fields of said coils.

2. A method according to claim 1, wherein the magnetic fields generated by the coils overlap.

3. A method according to claim 1, wherein the step of feeding an electric current of varying magnitude to each of two coils is comprised of the step of feeding three phase AC current to three coils spaced apart along the length of said salt retention passage, each coil having a respective one of said phases fed thereto.

4. An apparatus for removing dissolved solids from water comprising:

an elongate salt retention passage bounded by a reverse osmosis membrane;

means for feeding water to said salt retention passage so that water flows along said salt retention passage;

at least two coils spaced apart along the length of the salt retention passage:

means for applying a voltage of varying magnitude to each of said coils to cause each coil to generate a fluctuating magnetic field;

the water in said salt retention passage, in use of the apparatus, being subjected to said fluctuating magnetic fields of said coils; and, a casing of elongate form, a cartridge of elongate form in said casing, said cartridge including semi-permeable membranes bounding a multitude of the salt retention passages, and the coils being spaced apart along the length of the casing.

5. The apparatus according to claim 4, wherein the coils comprise three coils spaced apart along the length of the casing, and means for supplying a three phase AC current, each coil having a respective one of the phases connected to its whereby the fields generated by the three coils are of out phase with one another.

6. The apparatus according to claim 5, wherein said means for feeding water further comprises a pump driven by a three phase electric motor, said motor being connected to said three phase AC supply through the coils which act as chokes for the motor.

7. The apparatus according to claim 6, further comprising an adjustable frequency AC drive between said coils and said motor.

8. The apparatus according to claim 7, further comprising a pressure sensor for sensing tie pressure at a pump pressure port and feeding a control signal to said drive whereby the drive controls said motor in such manner as to provide a constant pressure at said port.

9. The apparatus according to claim 4, further comprising a plate with a plurality of holes in it between said means for feeding water and said cartridge, the holes in the plate dividing the water up into streams and directing said streams of water against the end of the cartridge whereby the water entering the salt retention passages has eddy currents in it and there is a pressure drop across said plate.

10. The apparatus according to claim 4, wherein said casing has a cylindrical wall of fibre reinforced settable resin, said coils being embedded in said cylindrical wall.

11. The apparatus according to claim 10, further comprising layers of gel radially inwardly and radially outwardly of the coils, for protecting and cushioning the coils.

12. The apparatus according to claim 4, wherein said coils are positioned so that their magnetic fields overlap.

* * * * *